United States Patent
Kim et al.

[19]

[11] Patent Number: 5,900,998
[45] Date of Patent: May 4, 1999

[54] THIN FILM ACTUATED MIRROR ARRAY AND METHOD FOR THE MANUFACTURE THEREOF

[75] Inventors: Dong-Kuk Kim; Jeong-Beom Ji; Seok-Won Lee, all of Seoul, Rep. of Korea

[73] Assignee: Daewoo Electronics Co., Ltd., Rep. of Korea

[21] Appl. No.: 08/877,084

[22] Filed: Jun. 17, 1997

Related U.S. Application Data

[62] Division of application No. 08/331,399, Oct. 28, 1994, Pat. No. 5,661,611.

[30] Foreign Application Priority Data

| | | | |
|---|---|---|---|
| Oct. 29, 1993 | [KR] | Rep. of Korea | 93-22798 |
| Nov. 16, 1993 | [KR] | Rep. of Korea | 93-24398 |
| Nov. 30, 1993 | [KR] | Rep. of Korea | 93-25879 |
| Dec. 30, 1993 | [KR] | Rep. of Korea | 93-31720 |

[51] Int. Cl.$^6$ .............. G02B 7/182; G02B 5/08; G02B 26/08
[52] U.S. Cl. .............. 359/871; 359/872; 359/224; 359/225; 359/223; 359/291; 359/848; 359/226
[58] Field of Search .............. 359/871, 872, 359/224, 225, 223, 291, 848

[56] References Cited

U.S. PATENT DOCUMENTS

| | | | |
|---|---|---|---|
| 1,985,424 | 12/1934 | Piggott | 554/66 |
| 2,016,962 | 10/1935 | Flint et al. | 536/55.3 |
| 2,290,529 | 1/1942 | Blythe | 33/555.1 |
| 2,703,798 | 3/1955 | Schwartz | 554/66 |
| 3,544,201 | 12/1970 | Fowler et al. | 359/224 |
| 3,614,677 | 10/1971 | Wilfinger | 333/200 |
| 3,758,199 | 9/1973 | Thaxter | 359/224 |
| 4,441,791 | 4/1984 | Hornbeck | 359/295 |
| 4,518,976 | 5/1985 | Tarumi et al. | 347/155 |
| 4,529,620 | 7/1985 | Glenn | 438/29 |
| 4,932,119 | 6/1990 | Ealey et al. | 29/593 |
| 4,947,487 | 8/1990 | Saffer et al. | 2/161.7 |
| 4,979,789 | 12/1990 | Um | 385/2 |
| 5,032,906 | 7/1991 | Um | 348/180 |
| 5,035,475 | 7/1991 | Lee et al. | 359/212 |
| 5,085,497 | 2/1992 | Un et al. | 359/848 |
| 5,126,836 | 6/1992 | Um | 348/771 |
| 5,138,309 | 8/1992 | Gonzalez et al. | 345/84 |
| 5,150,205 | 9/1992 | Um et al. | 348/757 |
| 5,159,225 | 10/1992 | Um | 310/328 |
| 5,175,465 | 12/1992 | Um et al. | 310/328 |
| 5,185,660 | 2/1993 | Um | 348/755 |

(List continued on next page.)

FOREIGN PATENT DOCUMENTS

| | | |
|---|---|---|
| 419853 | 4/1991 | European Pat. Off. . |
| 3720469 | 12/1988 | Germany . |
| 91/09503 | 6/1991 | WIPO . |
| 93/08501 | 4/1993 | WIPO . |

Primary Examiner—Cassandra C. Spyrou
Assistant Examiner—Mohammad Y. Sikder
Attorney, Agent, or Firm—Cushman Darby & Cushman Intellectual Property Group of Pillsbury Madison & Sutro, LLP

[57] ABSTRACT

There is provided an array of M×N thin film actuated mirrors for use in an optical projection system comprising an active matrix, an array of M×N thin film actuating structures, each of the thin film actuating structures including at least a thin film layer of a motion-inducing material, a pair of electrodes, each of the electrodes being provided on top and bottom of the thin film motion-inducing layer, an array of M×N supporting members, each of the supporting members being used for holding each of the actuating structures in place by cantilevering each of the actuating structures and also for electrically connecting each of the actuating structures and the active matrix, and an array of M×N mirrors for reflecting light beams, each of the mirrors being placed on top of each of the actuating structures. An electrical signal is applied across the thin film layer of the motion-inducing material located between the pair of electrodes in each of the actuating structures, causing a deformation thereof, which will in turn deform the mirror placed on top thereof.

31 Claims, 10 Drawing Sheets

U.S. PATENT DOCUMENTS

| | | | |
|---|---|---|---|
| 5,212,582 | 5/1993 | Nelson | 359/224 |
| 5,233,456 | 8/1993 | Nelson | 359/214 |
| 5,245,369 | 9/1993 | Um et al. . | |
| 5,247,222 | 9/1993 | Engle | 310/328 |
| 5,260,798 | 11/1993 | Um et al. . | |
| 5,481,396 | 1/1996 | Ji et al. . | |
| 5,488,505 | 1/1996 | Engle | 359/292 |
| 5,510,824 | 4/1996 | Nelson | 347/239 |
| 5,661,611 | 8/1997 | Kim et al. | 359/291 |

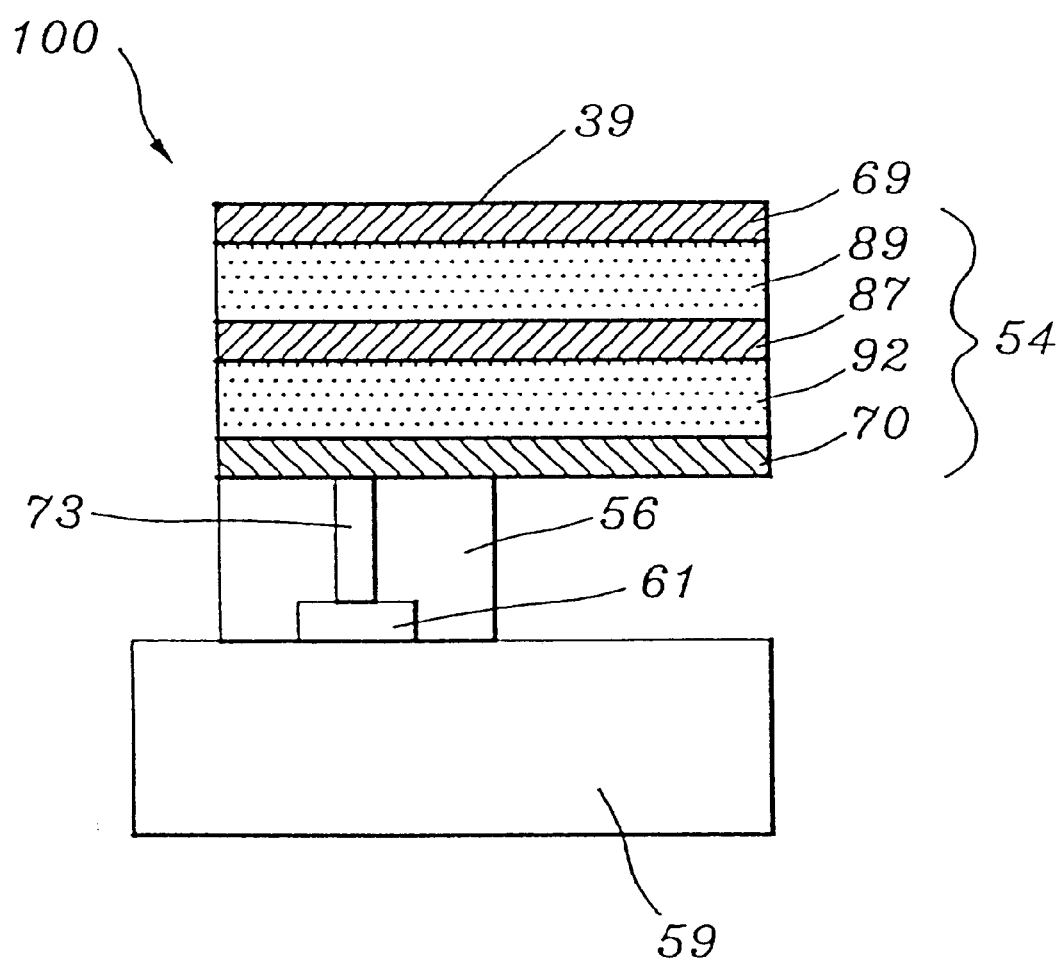

THIN FILM ACTUATED MIRROR ARRAY AND METHOD FOR THE MANUFACTURE THEREOF

This is a division of application Ser. No. 08/331,399, filed Oct. 28, 1994, U.S. Pat. No. 5,661,611.

FIELD OF THE INVENTION

The present invention relates to an optical projection system; and, more particularly, to an array of M×N thin film actuated mirrors for use in the system.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an M×N electrodisplacive actuated mirror array 10 for use in an optical projection system, disclosed in a copending commonly owned application, U.S. Ser. No. 08/278,472, entitled "ELECTRODISPLACIVE ACTUATED MIRROR ARRAY", comprising: an active matrix 11 including a substrate 12 and an array of M×N transistors thereon; an array 13 of M×N electrodisplacive actuators 30, each of the electrodisplacive actuators 30 including a pair of actuating members 14, 15, a pair of bias electrodes 16, 17, and a common signal electrode 18; an array 19 of M×N hinges 31, each of the hinges 31 fitted in each of the electrodisplacive actuators 30; an array 20 of M×N connecting terminals 22, each of the connecting terminals 22 being used for electrically connecting each of the signal electrodes 18 with the active matrix 11; and an array 21 of M×N mirrors 23, each of the mirrors 23 being mounted on top of each of the M×N hinges 31.

In the above mentioned copending, commonly owned application, there is also disclosed a method for manufacturing such an array of M×N electrodisplacive actuated mirrors, employing a ceramic wafer having a thickness of 30 to 50 μm.

There is room for further improvements over the above described method for manufacturing an array of M×N electrodisplacive actuators, however. First of all, it is rather difficult to obtain a ceramic wafer having a thickness of 30 to 50 μm; and, furthermore, once the thickness of the ceramic wafer is reduced to a 30 to 50 μm range, the mechanical properties thereof are likely to degrade which may, in turn, make it difficult to carry out the manufacturing process.

In addition, it involves a number of time consuming, hard to control, and tedious processes, thereby making it difficult to obtain the desired reproducibility, reliability and yield; and, furthermore, there may be a limit to the down sizing thereof.

SUMMARY OF THE INVENTION

It is, therefore, a primary object of the present invention is to provide a method for manufacturing an array of M×N actuated mirrors, which dispenses with the use of a thin electrodiplacive ceramic wafer.

It is another object of the present invention to provide an improved and novel method for manufacturing an array of M×N actuated mirrors which will give higher reproducibility, reliability and yield by utilizing the known thin film techniques commonly employed in the manufacture of semiconductors.

It is a further object of the present invention to provide an array of M×N actuated mirrors having a novel structure, incorporating a plurality of thin film layers of a motion-inducing, an electrically conducting and a light reflecting materials.

In accordance with one aspect of the present invention, there is provided an array of M×N thin film actuated mirrors for use in an optical projection system, the array comprising: an active matrix including a substrate, an array of M×N transistors and an array of M×N connecting terminals; an array of M×N thin film actuating structures, each of the actuating structures being provided with a top and a bottom surfaces, a proximal and a distal ends, each of the actuating structures including at least a thin film layer of a motion-inducing material having a top and bottom surfaces, and a first and a second electrodes of a specific thickness, the first electrode being placed on the top surface of the motion-inducing layer and the second electrode, on the bottom surface thereof, wherein an electrical signal applied across the motion-inducing layer between the first and second electrodes causes a deformation of the motion-inducing layer, and hence the actuating structure; an array of M×N supporting members, each of the supporting members being provided with a top and a bottom surfaces, wherein each of the supporting members is used for holding each of the actuating structures in place and also electrically connecting each of the actuating structures and the active matrix; and an array of M×N mirrors for reflecting light beams, wherein each of the mirrors is placed on top of each of the actuating structures such that each of the mirrors deforms in response to the deformation of each of the actuating structures.

In accordance with another aspect of the present invention, there is provided a novel method for manufacturing an array of M×N actuated mirrors for use in an optical projection system, utilizing the known thin film techniques, the method comprising the steps of: (a) providing an active matrix having a top and a bottom surfaces, the active matrix including a substrate, an array of M×N transistors and an array of M×N connecting terminals; (b) forming a supporting layer on the top surface of the active matrix, the supporting layer having an array of M×N pedestals corresponding to the array of M×N supporting members in the array of M×N thin film actuated mirrors and a sacrificial area; (c) treating the sacrificial area of the supporting layer to be removable; (d) depositing a first thin film electrode layer on the supporting layer; (e) providing a thin film motion-inducing layer on the first thin film electrode layer; (f) forming a second thin film electrode layer on the thin film motion-inducing layer; (g) depositing a mirror layer, made of a light reflecting material, on the second thin film electrode layer; and (h) removing the sacrificial area of the supporting layer to thereby form said array of M×N thin film actuated mirrors.

BRIEF DESCRIPTION OF THE DRAWINGS

The above and other objects and features of the present invention will become apparent from the following description of preferred embodiments given in conjunction with the accompanying drawings, wherein:

FIG. 12 displays a cross sectional view of an actuated mirror of the second embodiment having the first electrode made of a light reflecting material.

DETAILED DESCRIPTION OF THE PREFERRED EMBODIMENTS

Figure 1:
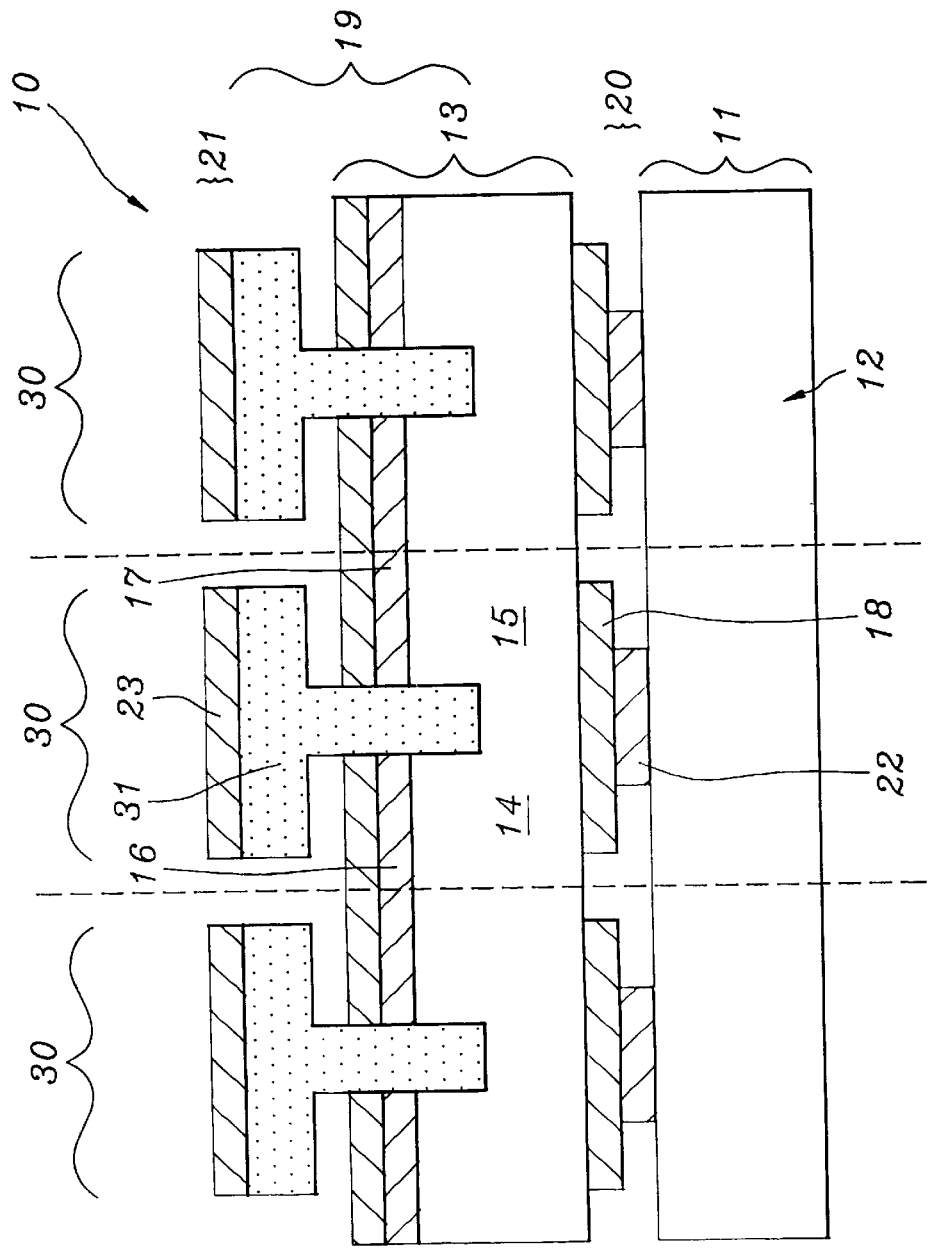
FIG. 1 shows a cross sectional view of an array of M×N electrodisplacive actuated mirrors previously disclosed.

Referring now to FIGS. 2 to 13, there are provided schematic cross sectional views of the inventive array of M×N thin film actuated mirrors for use in an optical projection system, wherein M and N are integers, in accordance with preferred embodiments of the present invention. It should be noted that like parts appearing in FIGS. 2 to 13 are represented by like reference numerals.

Figure 2:
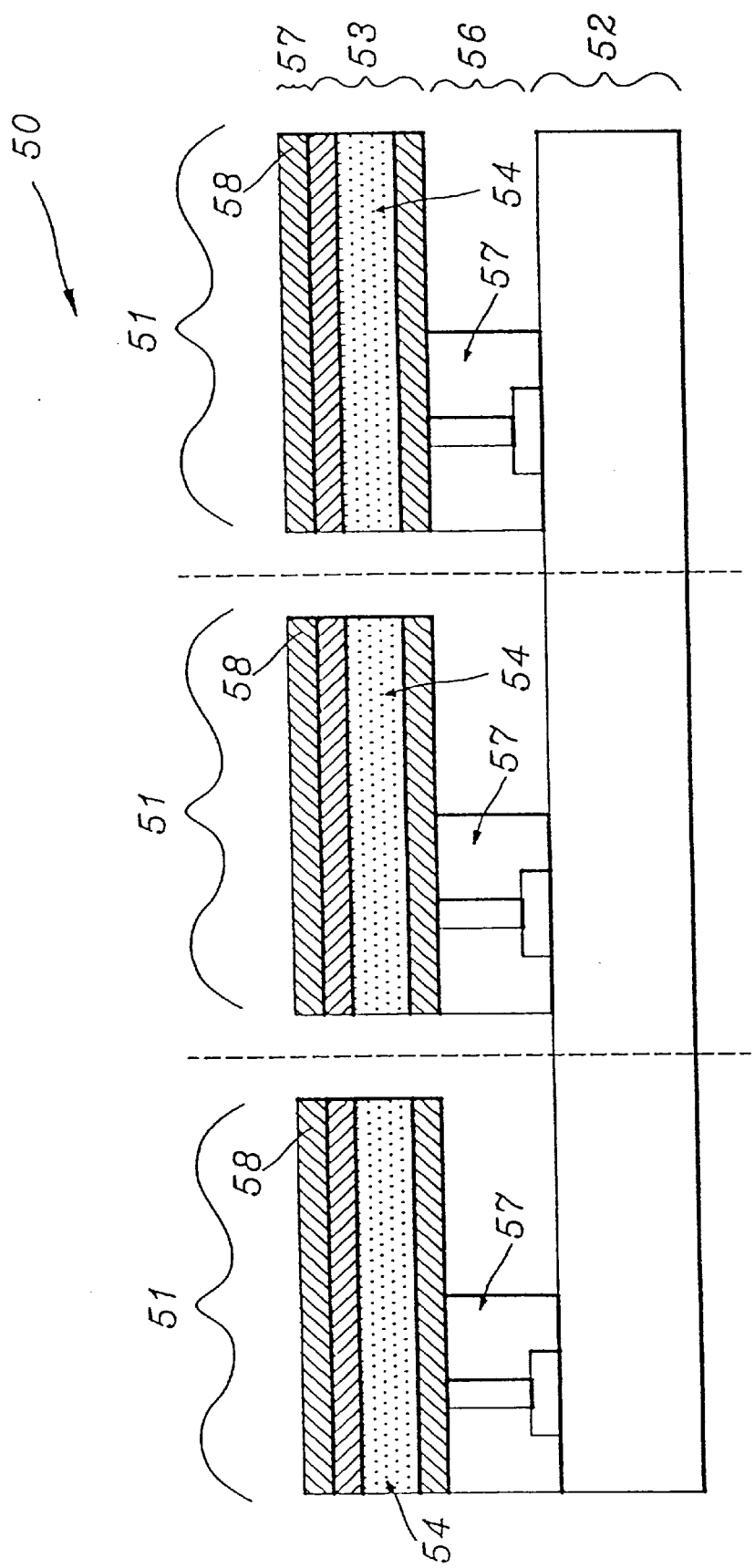
FIG. 2 represents a cross sectional view of an array of M×N thin film actuated mirrors is accordance with a preferred embodiment of the present invention.

In FIG. 2, there is illustrated a cross sectional view of a first embodiment of an array 50 of M×N thin film actuated mirrors 51, comprising an active matrix 52, an array 53 of M×N thin film actuating structures 54, an array 55 of M×N supporting members 56 and an array 57 of M×N mirrors 58.

Figure 3:
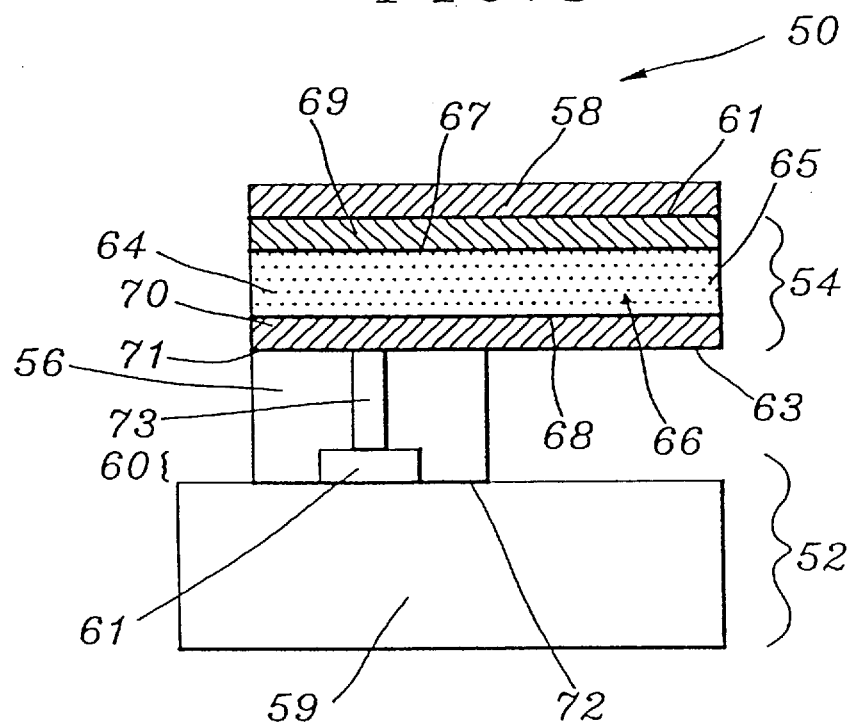
FIG. 3 illustrates a detailed cross sectional view of an thin film actuated mirror of the first embodiment shown in FIG. 2.

FIG. 3 represents a detailed cross sectional view of a thin film actuated mirror 51 shown in FIG. 2. The active matrix 52 includes a substrate 59, an array of M×N transistors (not shown) and an array 60 of M×N connecting terminals 61. Each of the thin film actuating structures 54 is provided with a top and a bottom surfaces 61, 63, a proximal and a distal ends, 64, 65, and further includes at least a thin film layer 66 of a motion inducing material having a top and a bottom surfaces 67, 68 and a first and second electrodes 69, 70 of a specific thickness, made of, e.g., a metal such as gold (Au) or silver (Ag), the first electrode 69 having a top surface 39. The first electrode 69 is placed on the top surface 67 of the motion-inducing thin film layer 66 and the second electrode 70, on the bottom surface 68 thereof. The motion-inducing thin film layer 66 is made of a piezoelectric ceramic, an electrostrictive ceramic, a magnetrostrictive ceramic or a piezoelectric polymer. In the case when the motion-inducing thin film layer is made of a piezoelectric ceramic or a piezoelectric polymer, it must be poled.

Each of the M×N supporting members 56, provided with a top and bottom surfaces 71, 72, is used for holding each of the actuating structures 54 in place and also for electrically connecting the second electrode 70 in each of the actuating structures 54 with the corresponding connecting terminals 61 on the active matrix 52 by being provided with a conduit 73 made of an electrically conductive material, e.g., a metal. In this inventive array 50 of M×N thin film actuated mirrors 51, each of the actuating structures 54 is cantilevered from each of the supporting members 56 by being mounted on the top surface 71 of each of the supporting members 56 at the bottom surface 63 of each of the actuating structures 54 at the proximal end 64 thereof, and the bottom surface 72 of each of the supporting members 56 is placed on top of the active matrix 52. Each of the M×N mirrors 58 for reflecting light beams is placed on top of each of the actuating structures 54.

An electrical field is applied across the motion-inducing thin film layer 66 between the first and second electrodes 69, 70 in each of the actuating structures 54. The application of such an electric field will cause a deformation of the motion-inducing layer 66, hence the actuating structure 54, and hence the mirror 58 placed on top thereof.

Figure 4:
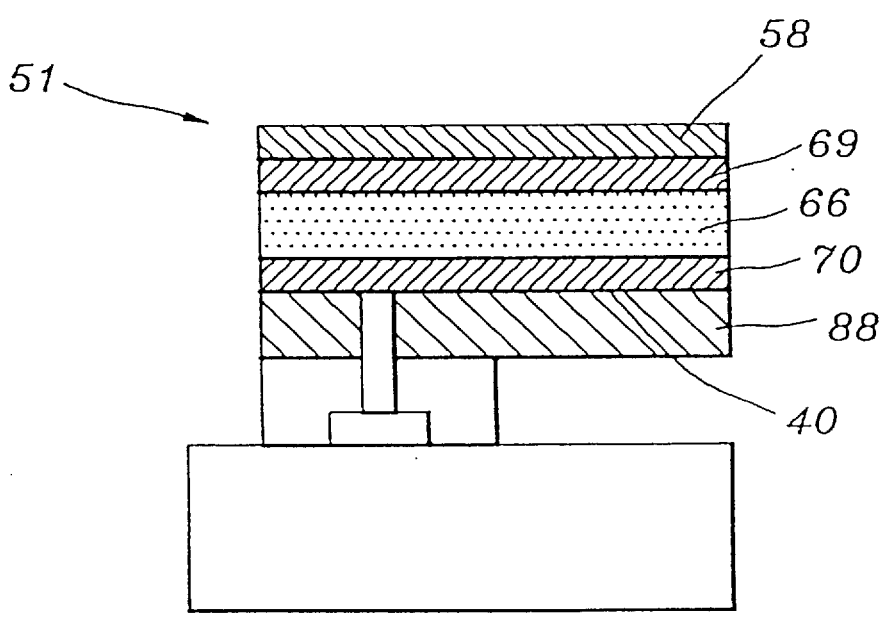
FIG. 4 offers a cross sectional view of an actuated mirror of the first embodiment with an elastic layer added intermediate the mirror and the first electrode.
Figure 5:
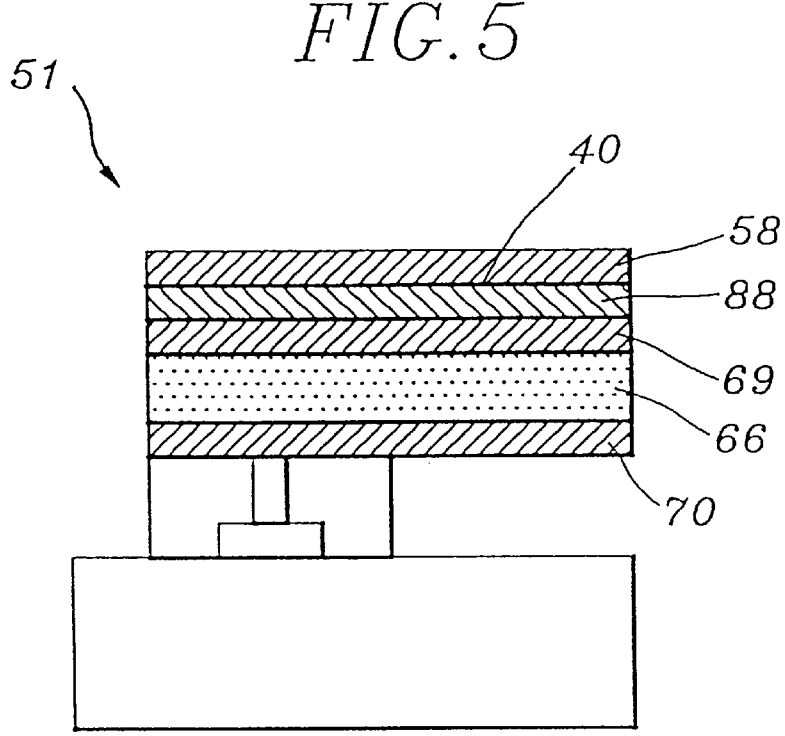
FIG. 5 depicts a cross sectional view of an actuated mirror of the first embodiment with an elastic layer placed on bottom of the second electrode.

In order for the array 50 of M×N thin film actuated mirrors 51 to function properly, the combined thickness of the mirror 58 and the first electrode 69 in each of the thin film actuated mirrors 51 must be different from that of the second electrode therein for the deformation thereof to take place. If not, an elastic layer 88 having a top surface 40 must be further provided to each of the actuated mirrors 51. The elastic layer 88 can be placed either intermediate the mirror 58 and the first electrode 69 or on bottom of the second electrode 70 in each of the actuated mirrors 51, as illustrated in FIGS. 4 and 5.

Figure 6:
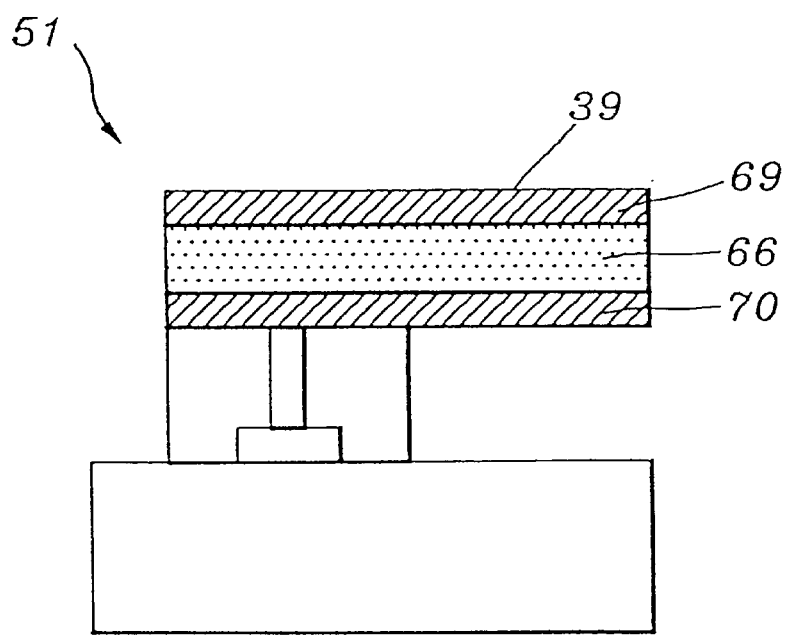
FIG. 6 presents a cross sectional view of an actuated mirror of the first embodiment having the first electrode made of a light reflecting material and provided with the first and second electrodes having a different thickness.
Figure 7:
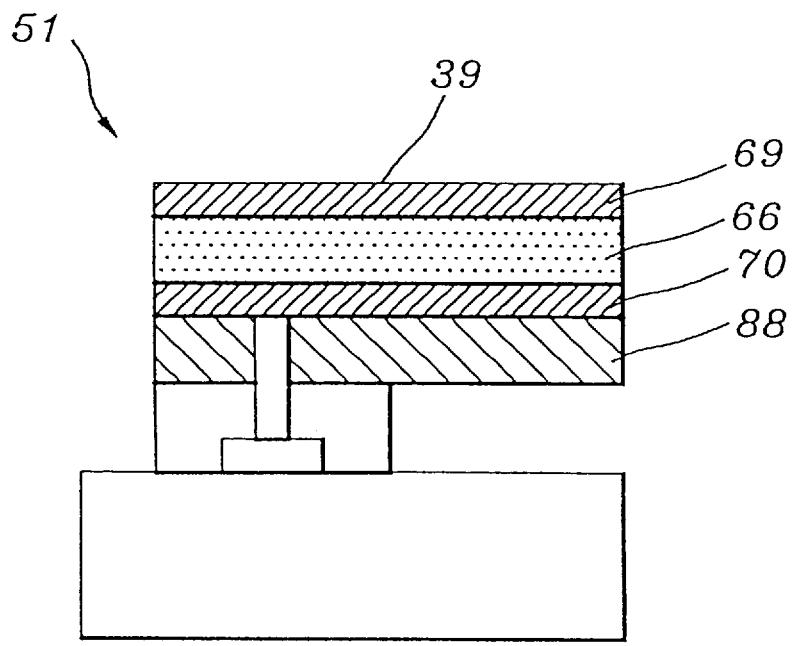
FIG. 7 describes a cross sectional view of an actuated mirror of the first embodiment having the first electrode made of a light reflecting material and provided with an elastic layer placed on the bottom surface of the actuating structure.

The electrically conducting material making up the first electrode 69 can be also light reflecting, e.g., aluminum (Al), which will allow the top surface 39 of the first electrode function also as the mirror 58 in each of the thin film actuated mirrors 51. In such a case, in order for each of the thin film actuated mirrors 51 to function properly, the first and the second electrodes 69, 70 must be of a different thickness or each of the thin film actuated mirrors 51 must be provided with an elastic layer 88 placed on the bottom surface of each of the actuating structures therein, as shown in FIGS. 6 and 7. Furthermore, if the elastic layer 88 is made of a light reflecting material, it can also function as the mirror 58, as depicted in FIG. 8.

Figure 9A:
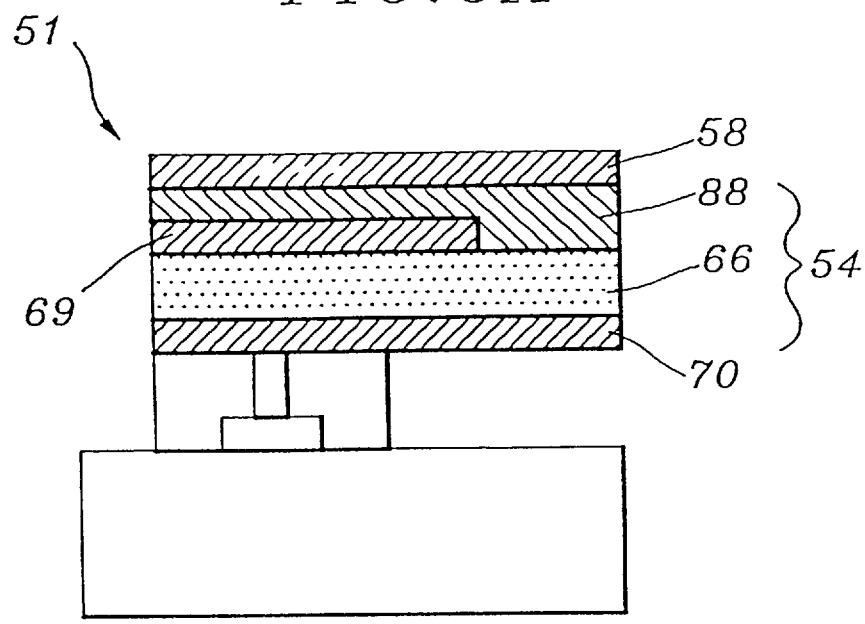
FIGS. 9A and 9B demonstrate a cross sectional view of an actuated mirror of the first embodiment having either one of the top and bottom surfaces of the motion-inducing layer in each of the actuating structure covered partially with the first and second electrodes.
Figure 9B:
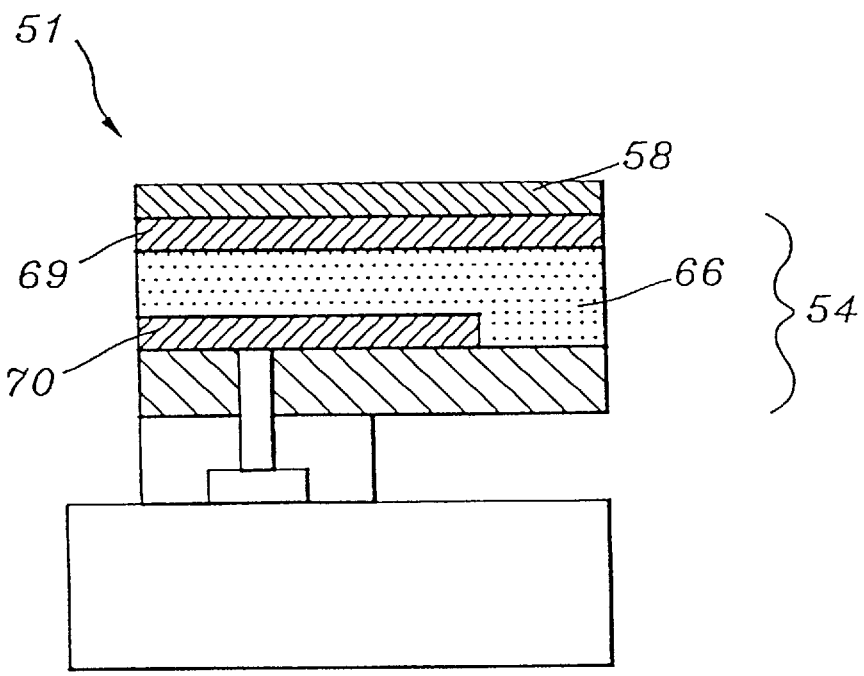

It is possible for the inventive array 50 of thin film actuated mirrors 51 to function equally well by having the top and bottom surfaces 67, 68 of the motion-inducing thin film layer 66 in each of the actuating structures 54 covered completely with the first and second electrodes 69, 70 or by having either one of the top and bottom surfaces 69, 70 of the motion-inducing thin film layer 66 in each of the actuating structures 54 covered partially with the first and second electrodes 69, 70. Two examples of the actuated mirror 51 having such a structure are illustrated in FIGS. 9A and 9B.

Figure 8:
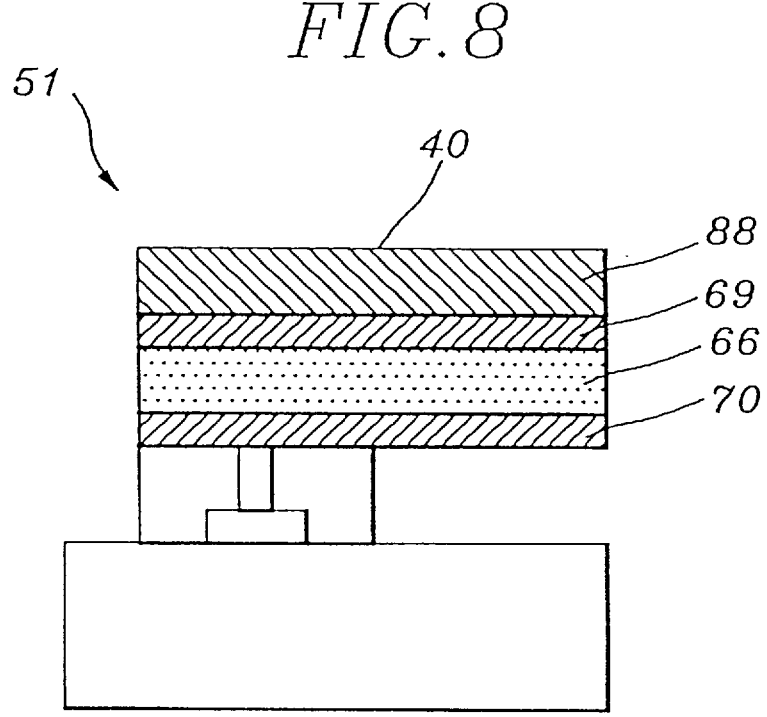
FIG. 8 explains a cross sectional view of an actuated mirror of the first embodiment with an elastic layer placed on top of the first electrode and made of a light reflecting material.
Figure 10:
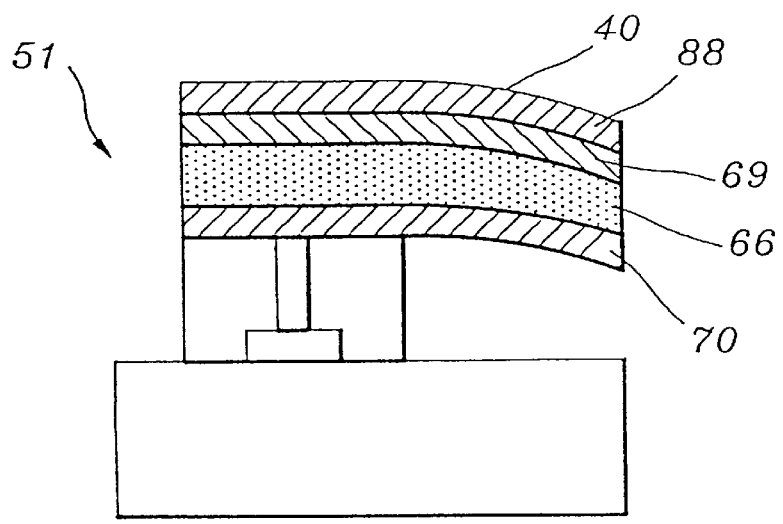
FIG. 10 discloses a cross sectional view of an actuated mirror of the first embodiment in an actuated state.

By way of example of the first embodiment, there are illustrated is FIGS. 8 and 10 an array 50 of M×N thin film actuated mirrors 51 comprising an array of M×N actuating structures 54, made of a piezoelectric ceramic, e.g., lead zirconium titanate(PZT). An electric field is applied across the motion-inducing thin film piezoelectric layer 66 located between the first and second electrodes 69, 70 in each of the actuating structures 54. The application of the electric field will either cause the piezoelectric ceramic to contract or expand, depending on the polarity of the electric field with respect to the poling of the piezoelectric material. If the polarity of the electric field corresponds to the polarity of the piezoelectric corresponds to the polarity of the piezoelectric ceramic, the piezoelectric ceramic will contract. If the polarity of the electric field is opposite the polarity of the piezoelectric ceramic, the piezoelectric ceramic will expand.

With reference to FIGS. 8 and 10 the polarity of the piezoelectric ceramic corresponds to the polarity of the applied electric field, causing the piezoelectric ceramic to contract.

Because the elastic layer 88 does not contract, the actuating structure bends downward, as shown in FIG. 10. Referring now to FIGS. 8 and 10, it can be shown that the light impinging the top surface 40 of the elastic layer 88, functioning as the mirror 58, of the actuated mirror 51 shown in FIG. 10 is deflected at a larger angle than the light reflected from of the unactuated actuated mirror 51 shown in FIG. 8.

Alternatively, an electric field of a reverse polarity may be applied across the motion-inducing thin film piezoelectric layer 66, causing the piezoelectric ceramic to expand. In this example, the elastic layer 88 does not expand, and as a result, the actuating structure 54 bends upward(not shown). The light impinging the mirror 58 of the upwardly actuated mirror 51 is deflected at a smaller angle than the light deflected from the top surface 40 of the elastic layer 88 of the unactuated actuated mirror 51 shown in FIG. 8.

Figure 11:
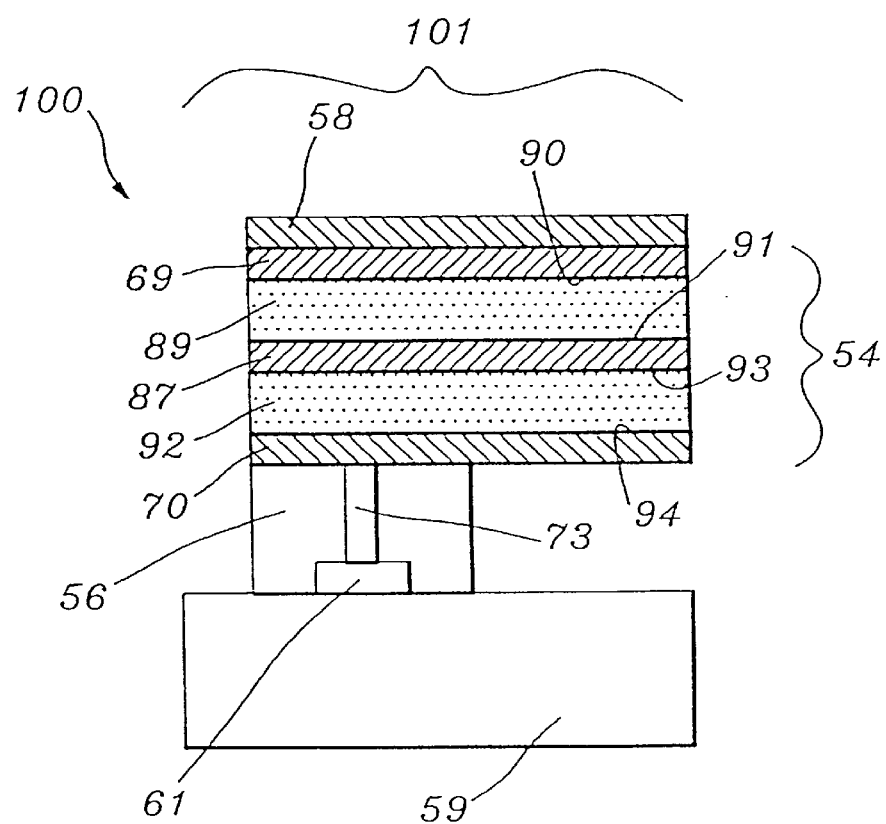
FIG. 11 provides a cross sectional view of an actuated mirror of the second embodiment having a bimorph structure.

There is shown in FIG. 11, a cross sectional view of a second embodiment of an array 100 of M×N thin film actuated mirrors 101, wherein the second embodiment is similar to the first embodiment except that each of the actuating structures 54 is of a bimorph structure, including a first electrode 69, a second electrode 70, an intermediate metal layers 87 an upper motion-inducing thin film layer 89 having a top and a bottom surfaces 90, 91 and a lower motion-inducing thin film layer 92 provided with a top and bottom surfaces 93, 94. In each of the actuating structures 54, the upper and lower motion-inducing thin film layers 89, 92 are separated by the intermediate metal layer 87, the first electrode 69 placed on the top surface 90 of the upper motion-inducing thin film layer 89, and the second electrode 70, on the bottom surface 94 of the lower motion-inducing thin film layer 92.

As in the case of the first embodiment, the upper and lower motion-inducing thin film layers 89, 92 in each of the actuating structures 54 are made of a piezoelectric ceramic, an electrostrictive ceramic, a magnetostrictive ceramic or a piezoelectric polymer. In the case when the upper and lower motion-inducing thin film layers 89, 92 are made of a piezoelectric ceramic or a piezoelectric polymer, the upper and lower motion-inducing thin film layers 89, 92 must be poled in such a way that the polarization direction of piezoelectric material in the upper motion-inducing thin film layer 89 is opposite from that of the lower motion-inducing thin film layer 92. FIG. 12 illustrates a cross sectional view of an actuated mirror 101 of the second embodiment, wherein the first electrode 69 is made of a light reflecting material, thereby allowing the top surface 39 thereof to also function as the mirror 58.

As an example of how the second embodiment functions, assume that the upper and lower motion-inducing layers 89, 90 in the array 100 of M×N thin film actuated mirrors 101 shown in FIG. 11 are made of a piezoelectric ceramic, e.g., PZT. When an electric field is applied across each of the actuating structure 54, the upper and lower motion-inducing thin film piezoelectric layers 89, 92, the actuating structure 54 will either bend upward or downward, depending on the poling of the piezoelectric ceramic and the polarity of the electric field. For example, of the polarity causes the upper motion-inducing thin film piezoelectric layer 89 to contract, and the lower motion-inducing thin film piezoelectric layer 92 to expand, the actuating structure 54 will bend upward. In this situation, the impinging light is deflected of a smaller angle from the actuating structure 54 than the deflected light from the unactuated actuating structure 54. However if the polarity of the piezoelectric ceramic and the electric field causes the upper motion-inducing thin film piezoelectric layer 89 to expand and the lower motion-inducing thin film piezoelectric layer 92 to contract, the actuating structure 54 will bend downward. In this situation, the impinging light is deflected at a larger angle from the actuating structure 54 than the deflected light from the unactuated actuating structure 54.

Figure 13A:
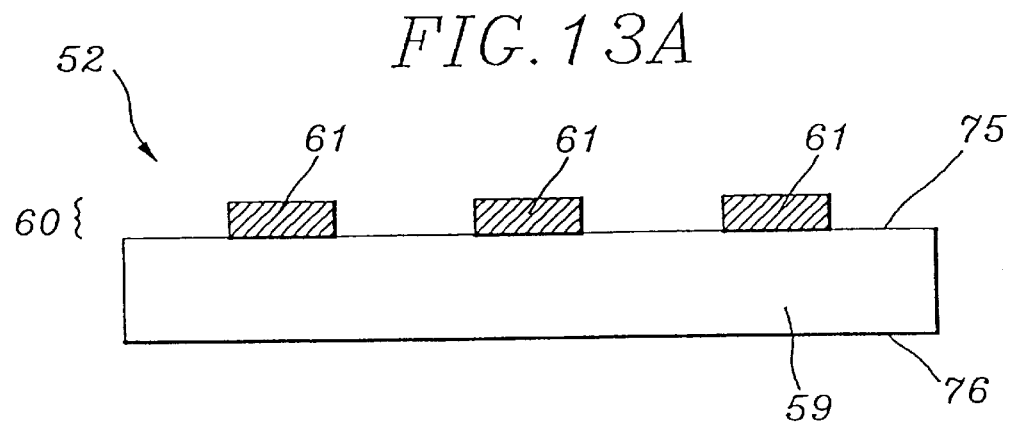
FIGS. 13A to 13F reproduce schematic cross sectional views setting forth the manufacturing steps for the first embodiment in accordance with the present invention.

There are illustrated in FIGS. 13A to 13F manufacturing steps involved in manufacturing of the first embodiment of the present invention. The process for manufacturing the first embodiment, i.e., the array 50 of M×N thin film actuated mirror 51, wherein M×N are integers, begins with the preparation of the active matrix 52, having a top and a bottom surfaces 75, 76, comprising the substrate 59, the array of M×N transistors (not shown) and the array 60 of M×N connecting terminals 61, as illustrated in FIG. 13A.

Figure 13B:
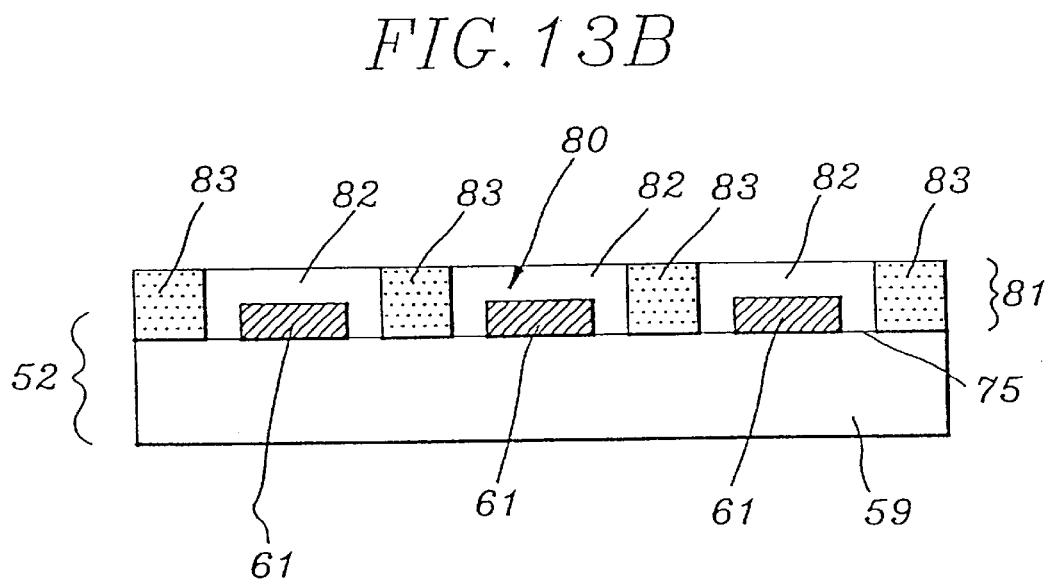

In the subsequent step, there is formed on the top surface 75 of the active matrix 52 a supporting layer 80, including an array 81 of M×N pedestals 82 corresponding to the array 55 of M×N supporting members 56 and a sacrificial area 83, wherein the supporting layer 80 is formed by: depositing a sacrificial layer (not shown) on the entirety of the top surface 75 of the active matrix 52; forming an array of M×N empty slots (not shown), to thereby generated the sacrificial area 83, each of the empty slots being located around each of the M×N connecting terminals 61; and providing a pedestal 82 in each of the empty slots, as shown in FIG. 13B. The sacrificial layer is formed by using a sputtering method, the array of empty slots, using an etching method, and the pedestals, using a sputtering or a chemical vapor deposition (CVD) method, followed by an etching method. The sacrificial area 83 of the supporting layer 80 is then treated so as to be removable later using an etching method or the application of chemicals.

Figure 13C:
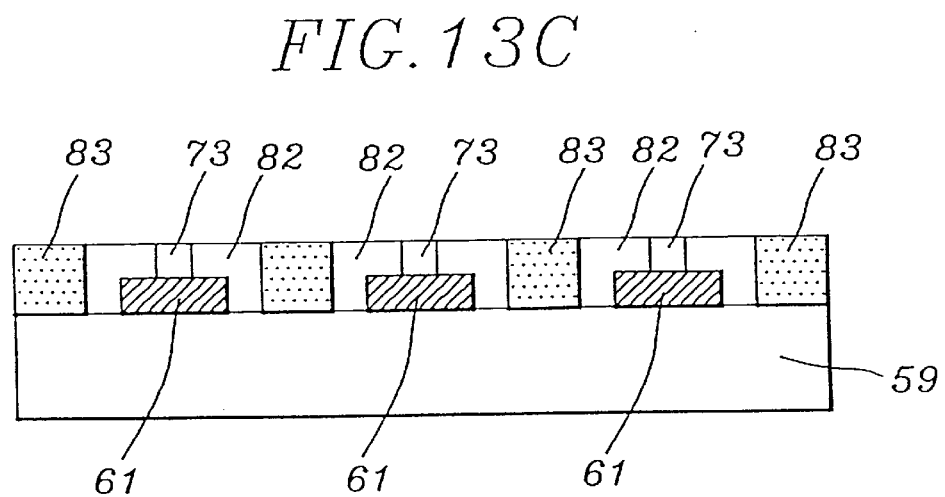

A conduit 73 for electrically connecting each of the connecting terminals 61 with each of the second electrode 70, made of an electrically conductive material, e.g., tungsten(W), is formed in each of the pedestals 82 by first creating a hole extending from top thereof to top of the corresponding connecting terminals 61 using an etching method, followed by filling therein with the electrically conducting material, as depicted in FIG. 13(C).

Figure 13D:
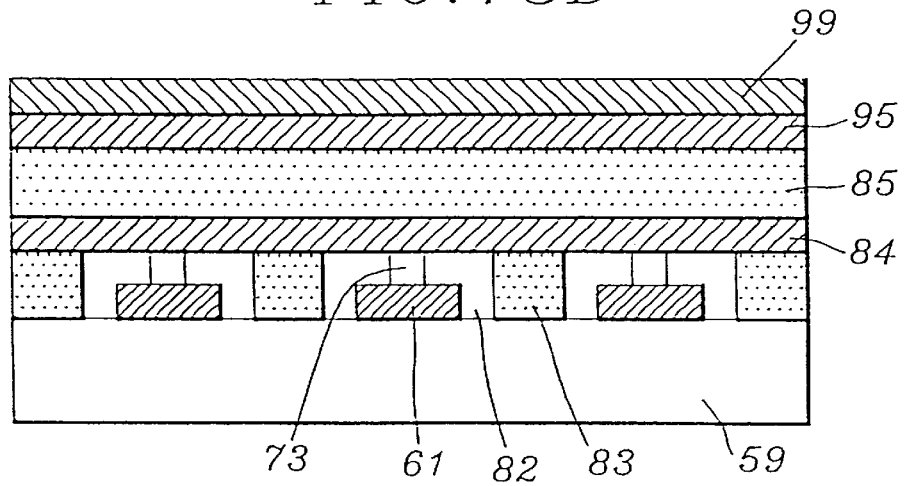

In the subsequent step, as depicted in FIG. 13D, a first thin film electrode layer 84, made of an electrically conducting material, e.g., Au, is deposited on the supporting layer 80. Thereafter, a thin film motion-inducing layer 85, made of a motion-inducing material, e.g., PZT, and a second thin film electrode layer 95 are then respectively formed on the first thin film electrode layer 84.

Subsequently, a thin film layer 99 of a light reflecting material, e.g., Al, is provided on top of the second electrode layer 95.

Figure 13E:
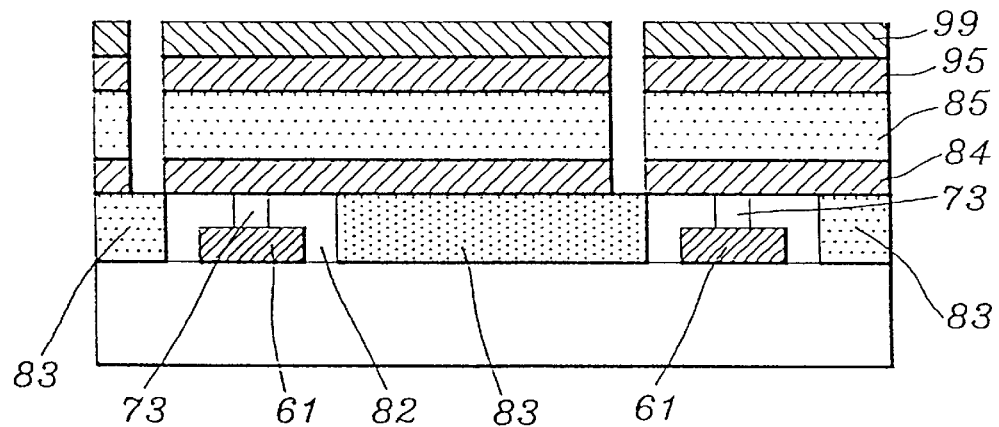

The thin film layers of the electrically conducting, the motion-inducing, and the light reflecting materials may be deposited and patterned with the known thin film techniques, such as sputtering, sol-gel, evaporation, etching and micro-machining, as shown in FIG. 13E.

Figure 13F:
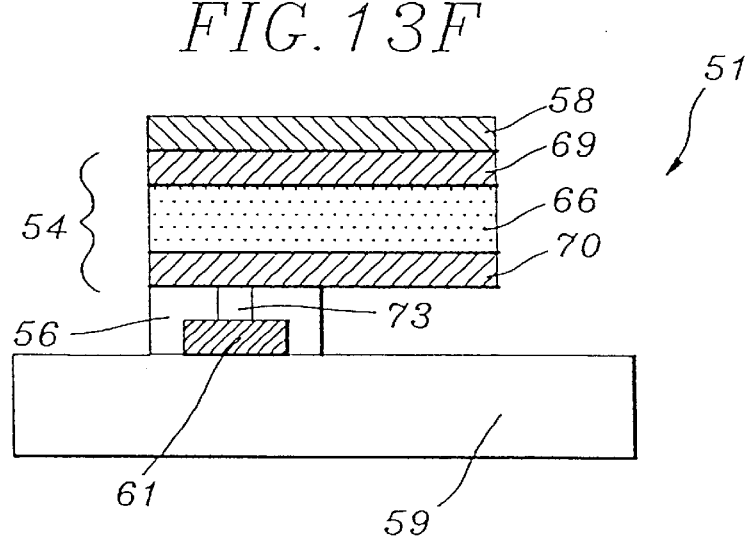

The sacrificial area 83 of the supporting layer 80 is then removed or dissolved by the application of chemical to thereby form said array 50 of M×N thin film actuated mirrors 51, as illustrated in FIG. 13F.

The second embodiment is fabricated in a similar manner as the first embodiment. The supporting layer is applied to the active matrix. The supporting layer also includes the array of M×N pedestals corresponding to the array of M×N supporting members and the sacrificial area. The first thin film electrode layer, the lower thin film motion-inducing layer, the intermediate metal layer, the upper thin film motion-inducing layer, the second thin film electrode layer, and the light reflecting layer are then deposited respectively on the supporting layer. The thin film layers of an electrically conducting, a motion-inducing and a light reflecting materials may be deposited and patterned with the known thin film techniques, as stated earlier. The sacrificial area of the supporting layer is next dissolved or removed by the application of a chemical, leaving the array 100 of thin film actuated mirrors 101, having the array 53 of M×N actuating structures 54 with the bimorph structure, each of the actuating structures 54 being cantilevered from each of the supporting members 56.

In the above described methods for manufacturing the first and second embodiments of the present invention, an additional process for forming the elastic layer 88 can be added, involving a similar process as in the forming of other thin film layers.

While the present invention has been described with respect to certain preferred embodiments only, other modifications and variations may be made without departing from the scope of the present invention as set forth in the following claims.

What is claimed is:

1. A method for manufacturing a thin film actuated mirror, comprising the steps of:

forming a sacrificial layer over top of a substrate;

forming a hole in said sacrificial layer to expose a portion of the substrate;

forming a supporting member in said hole, the supporting member including a pedestal made of an insulating material and an electrical conduit extending from top of the pedestal to top of the substrate;

forming a first electrically conductive layer over the remaining sacrificial layer and the supporting member;

forming a motion-inducing layer over said first conductive layer;

forming a second electrically conductive layer over said motion-inducing layer; and removing the sacrificial layer.

2. The method of claim 1, further comprising the step of forming a mirror layer over said second electrically conductive layer.

3. The method of claim 2, wherein said mirror layer forming step includes a sputtering process.

4. The method of claim 1, further comprising the step of forming an elastic layer over said second electrically conductive layer.

5. The method of claim 4, further comprising the step of forming a mirror layer over said elastic layer.

6. The method of claim 5, wherein said mirror layer forming step includes a sputtering process.

7. The method of claim 1, wherein said step of forming a motion-inducing layer comprises:

forming a first motion-inducing layer over said first conductive layer;

forming an electrically conductive intermediate layer over said first motion-inducing layer; and forming a second motion-inducing layer over said intermediate layer.

8. The method of claim 1, wherein said second electrically conductive layer includes a light reflective material functioning as a mirror.

9. The method of claim 1, wherein at least one of said step of forming a first electrically conductive layer and step of forming a second electrically conductive layer includes a sputtering process.

10. The method of claim 1, wherein said step of forming a motion-inducing layer includes a sputtering process.

11. The method of claim 1, wherein said step of forming a motion-inducing layer includes a chemical deposition process.

12. The method of claim 1, wherein said step of forming a motion-inducing layer includes a sol-gel process.

13. The method of claim 1, wherein said motion-inducing layer includes a piezoelectric material.

14. The method of claim 1, wherein said supporting member is formed by:

forming a pedestal made of insulating material in the hole;

forming an empty slots in said pedestal; and filling the empty slot with electrically conductive material to thereby form an electrical conduit.

15. The method of claim 1, said array of supporting members is formed by:

forming an array of pedestals made of insulating material in the holes;

forming an array of empty slots in said pedestals; and filling the empty slot with electrically conductive material to thereby form an electrical conduit.

16. A method of manufacturing an array of actuated mirrors, comprising the steps of:

forming a sacrificial layer over an active side of a substrate;

forming an array of holes in a matrix formed in said sacrificial layer, each hole corresponding to a respective one of said array of actuated mirrors;

forming an array of supporting members in said holes, each of the supporting members including a corresponding pedestal made of an insulating material and a corresponding electrical conduit extending from top of the pedestal to top of the substrate;

forming a first electrically conductive layer over the remaining sacrificial layer and the supporting members; and removing said sacrificial layer.

17. The method of claim 16, further comprising forming an elastic layer over said sacrificial layer and said supporting members before said forming of the first conductive layer.

18. The method of claim 16, further comprising the steps of forming a motion-inducing layer over said first conductive layer; and forming a second electrically conductive layer over said motion-inducing layer.

19. The method of claim 18, further comprising the step or forming a mirror layer over said second conductive layer.

20. The method of claim 19, wherein said mirror layer forming step includes a sputtering process.

21. The method of claim 18, further comprising the step of forming an elastic layer over said second electrically conductive layer.

22. The method of claim 21, further comprising the step of forming a mirror layer over said elastic layer.

23. The method of claim 18, wherein said step of forming a motion-inducing layer further comprises:

forming a first motion-inducing layer over said first conductive layer;

forming an electrically conductive intermediate layer over said first motion-inducing layer; and forming a second motion-inducing layer over said intermediate layer.

24. The method of claim 18, wherein said second electrically conductive layer includes a light reflective material functioning as a mirror.

25. The method of claim 18, wherein at least one of said step of forming a first electrically conductive layer and step of forming a second electrically conductive layer includes a sputtering process.

26. The method of claim 18, wherein said step of forming a motion-inducing layer includes a sputtering process.

27. The method of claim 18, wherein said step of forming a motion-inducing layer includes a chemical deposition process.

28. The method of claim 18, wherein said step of forming a motion-inducing layer includes a chemical deposition process.

29. A method for manufacturing a thin film actuated mirror, comprising the steps of:

forming a sacrificial layer over top of a substrate;

forming a hole in said sacrificial layer to expose a portion of the substrate;

forming a supporting member in said hole, the supporting member including a pedestal made of an insulating material and an electrical conduit extending from a top of the pedestal to the top of the substrate;

forming a first electrically conductive layer, said first electrically conductive layer being electrically connected to said electrical conduit;

forming a motion-inducing layer over said first conductive layer;

forming a second electrically conducting layer over said motion inducing layer; and removing the sacrificial layer.

30. The method of claim 29, further comprising the step of forming an elastic layer over said sacrificial layer.

31. The method of claim 29, further comprising the step of forming an elastic layer over said second electrically conductive layer.

* * * * *